United States Patent
Schulz et al.

(10) Patent No.: US 7,607,456 B1
(45) Date of Patent: Oct. 27, 2009

(54) PLUG FOR HYDROSTATIC TESTING OF FLEXIBLE POLYMERIC PIPE OR TUBING

(75) Inventors: Karl Robert Schulz, Reno, NV (US); Marshall W. Henningsen, Carson City, NV (US)

(73) Assignee: LSP Products Group, Inc., Carson City, NV (US)

( * ) Notice: Subject to any disclaimer, the term of this patent is extended or adjusted under 35 U.S.C. 154(b) by 0 days.

(21) Appl. No.: 12/142,248

(22) Filed: Jun. 19, 2008

(51) Int. Cl.
*F16L 55/00* (2006.01)
(52) U.S. Cl. .............................. 138/89; 138/90; 215/264
(58) Field of Classification Search .................. 138/89, 138/90; 251/215, 216; 220/375; 215/264
See application file for complete search history.

(56) References Cited

U.S. PATENT DOCUMENTS

| | | | | |
|---|---|---|---|---|
| 3,358,869 A | * | 12/1967 | Palmer et al. | 220/233 |
| 4,503,934 A | * | 3/1985 | Stephanus et al. | 184/1.5 |
| 4,506,705 A | * | 3/1985 | Thompson | 138/89 |
| 4,768,560 A | * | 9/1988 | Logsdon | 138/90 |
| 5,660,293 A | * | 8/1997 | Strom | 220/236 |
| 6,062,263 A | * | 5/2000 | Donovan et al. | 138/89 |
| 6,142,186 A | * | 11/2000 | Donovan | 138/89 |
| 6,250,337 B1 | * | 6/2001 | Bevacco | 138/89 |
| 6,494,463 B1 | * | 12/2002 | Rank | 277/607 |
| 7,232,159 B2 | | 6/2007 | O'Neill et al. | 285/340 |
| 7,272,971 B1 | | 9/2007 | Reimer et al. | 73/46 |

* cited by examiner

*Primary Examiner*—Patrick F Brinson
(74) *Attorney, Agent, or Firm*—Locke Lord Bissell & Liddell LLP

(57) ABSTRACT

A manually installable polymeric plug useful for hydrostatic pressure testing of polymeric pipe or tubing having a flexible wall, the plug having a substantially rigid polymeric handle with a threaded cylindrical section that is engageable with the polymeric pipe or tubing, and an elastomeric sealing member that extends forwardly of the first element and is insertable into the open end of the polymeric pipe or tubing and blocks fluid flow through the interior of the threaded cylindrical section, the elastomeric sealing member having a plurality of axially spaced sealing surfaces that provide a fluid seal between the sealing member and the inside wall of the polymeric pipe or tubing.

20 Claims, 2 Drawing Sheets

PLUG FOR HYDROSTATIC TESTING OF FLEXIBLE POLYMERIC PIPE OR TUBING

BACKGROUND OF THE INVENTION

1. Field of the Invention

This invention relation relates to plugs, and more particularly, to polymeric plugs that are useful for plugging flexible polymeric pipe and tubing, particularly polymeric pipe and tubing comprising crosslinked polyethylene ("PEX"), during hydrostatic pressure testing.

2. Description of Related Art

Building codes typically require hydrostatic pressure testing of water supply lines during installation. With the widespread use of polymeric pipe and tubing for water supply lines in recent years, devices and methods previously used for plugging metal or other rigid plastic conduits for hydrostatic testing during rough-in have been adapted to some extent for use with polymeric tubing. The devices and methods currently available typically require the use of a torch, crimping tool or glue to plug a tube. For example, brass plugs that have been used in the past to plug polymeric tubing during hydrostatic testing are relatively expensive to manufacture and require additional labor and the use of tools to crimp them into place. Some prior art devices have a sleeve that slides onto the end of a pipe or tubing before a plug is inserted into the open end, after which the sleeve is crimped over the inserted plug. More recently, hydrostatic test plugs have been disclosed that are made of plastic, but have a configuration that is similar to the metal plugs. Other prior art devices used in hydrostatic testing of pressurized water systems are disclosed, for example, in U.S. Pat. Nos. 7,232,159 and 7,272,971.

Notwithstanding the products that are previously known or commercially available, a need exists for hydrostatic test plugs that can be easily and inexpensively installed in polymeric tubing without using tools, that will provide a reliable hydraulic seal during pressure testing, and that are easily removable following testing by cutting off the pipe section containing the plug.

SUMMARY OF THE INVENTION

A manually installable polymeric plug useful for hydrostatic pressure testing of polymeric pipe or tubing having a flexible wall, the plug having a substantially rigid polymeric handle with a threaded cylindrical section that is engageable with the polymeric pipe or tubing, and an elastomeric sealing member that extends forwardly of the first element and is insertable into the open end of the polymeric pipe or tubing, the elastomeric sealing member having a plurality of sealing surfaces that provide a fluid seal between the sealing member and the inside wall. The plug of the invention is particularly preferred for use with pipe or tubing comprising crosslinked polyethylene. The subject plug is intended for one-time use, and can be conveniently removed following use by cutting off the pipe section in which it is installed.

According to a preferred embodiment of the invention, the handle and threaded section comprise a durable, substantially rigid, polymeric material such as glass-filled nylon, and the elastomeric sealing member comprises a rubbery material such as Santoprene® rubber.

According to another preferred embodiment of the invention, the threaded cylindrical section comprises external threads that cooperate with the elastomeric sealing member to hold the plug inside polymeric pipe or tubing when the pipe or tubing is undergoing hydrostatic pressure testing. It will be appreciated by those of ordinary skill in the art upon reading this disclosure that the maximum pressures the plug is able to withstand without being blown out of the end of a pipe in which it is installed can vary according to factors such as, for example, the pipe diameter, the materials of construction, and the type and number of threads. Although plugs made as disclosed herein are known to perform well at hydrostatic test pressures up to 125 psi where the polymeric pipe or tubing is made of cross-linked polyethylene and has a nominal diameter of 0.5 inches and a three-point start thread, such values are not intended to be limitative because plugs made in accordance with the invention can conceivably be used with pipe of any diameter and can function well at pressures either above or below those specifically stated herein. Similarly, start threads having from two to five starts are believed to be satisfactory for use in the invention, with a three-point start thread having a coarse pitch being particularly preferred to ensure that the plug goes into the pipe or tubing straight and to reduce the number of turns of the handle that are required to fully engage the plug.

According to another preferred embodiment of the invention, at least a portion of the elastomeric sealing member is insertable into and engageable with the portion of the test plug that comprises the handle and threaded section.

According to another embodiment of the invention, the elastomeric sealing member can comprise a single annular sealing surface, but most preferably comprises from two to four, and most preferably two or three, radially extending annular sealing surfaces that are axially spaced-apart and contact the inside wall of the polymeric pipe or tubing in which the plug is installed, thereby cooperating to create a fluid-tight seal capable of withstanding the anticipated hydrostatic test pressures without fluid leakage.

BRIEF DESCRIPTION OF THE DRAWINGS

The apparatus of the invention is further described and explained in relation to the following drawings wherein.

Like reference numerals are used to indicate like parts in all figures of the drawings.

DESCRIPTION OF THE PREFERRED EMBODIMENTS

Figure 1:
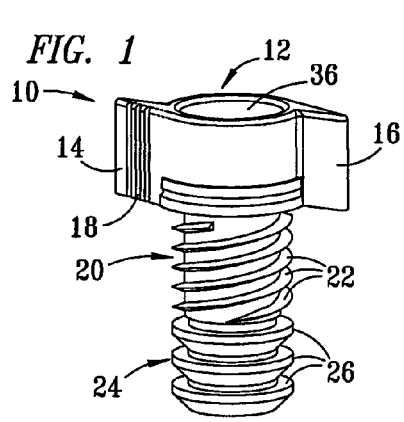
FIG. 1 is a front perspective view of a preferred embodiment of the plug of the invention.
Figure 2:
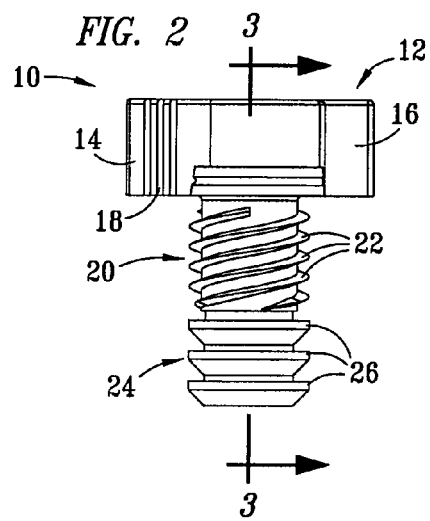
FIG. 2 is a front elevation view of the plug of FIG. 1.

Referring to FIGS. 1-7, plug 10 preferably comprises a first element further comprising handle 12 with diametrically opposed, radially extending wings 14, 16, and an axially extending cylindrical section 20 with a plurality of threads 22. Open interior 36 having a stepped inside diameter preferably extends longitudinally through handle 12 and cylindrical section 20. Handle 12 and cylindrical section 20 are preferably made of a durable polymeric material, and the use of glass-filled nylon as the polymeric material is particularly preferred. Most preferably, handle 12 and cylindrical section 20 are unitarily molded. Radially extending wings 14, 16 are desirably provided to assist a user in manually rotating handle 12 and cylindrical section 20 around their common longitudinal axis. Wings 14, 16 preferably further comprise a plurality of laterally spaced, vertically extending ridges 18 that provide an irregular contact surface for the fingers or thumb of a user, although it will be apparent to those of skill in the art upon reading this disclosure that other similarly effective surface texturing can likewise be used in practicing the invention. As shown on FIGS. 3 and 4, male threads 22 are preferably provided on sidewall 38 of cylindrical section 20 of plug 10 of the invention.

Figure 3:
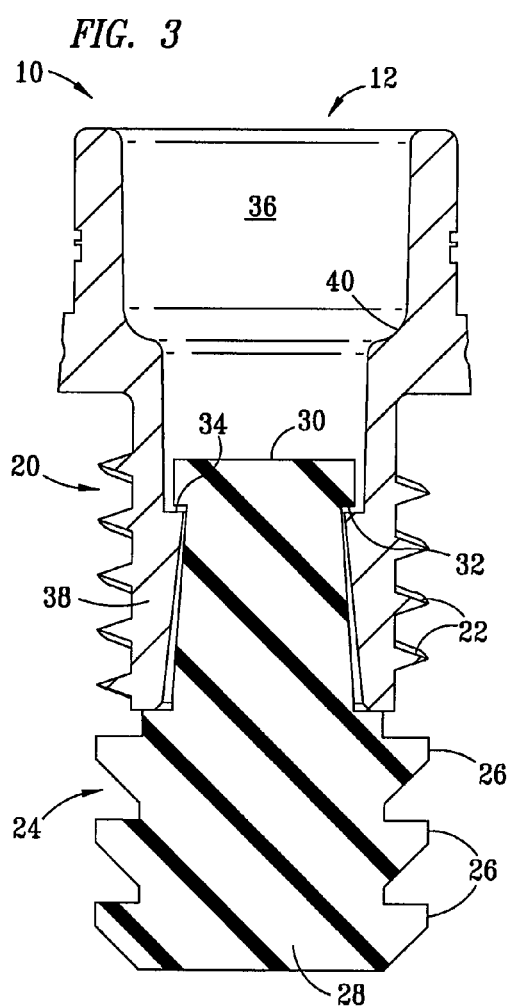
FIG. 3 is a cross-sectional elevation view taken along the line of 3-3 in FIG. 2.
Figure 5:
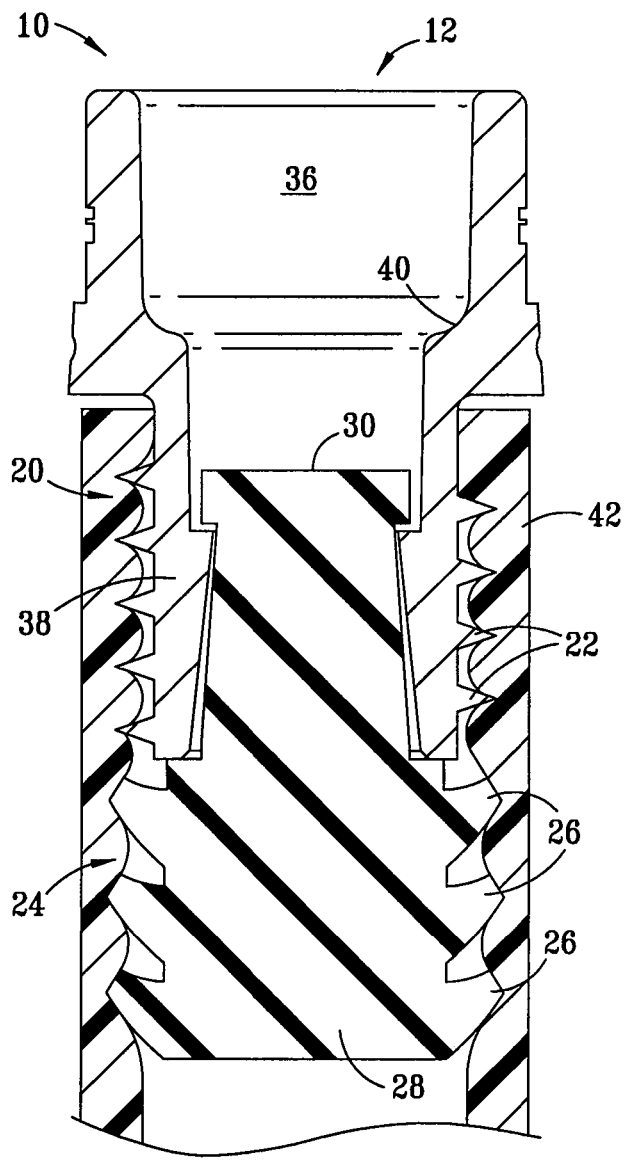
FIG. 5 is a cross-sectional view showing the plug of FIG. 3 inserted into the end of a segment of PEX pipe or tubing.
Figure 6:
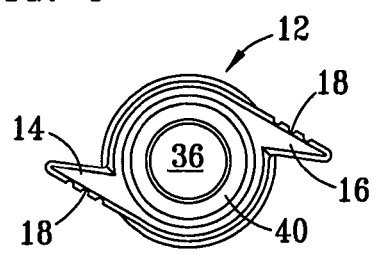
FIG. 6 is a top plan view of the handle and cylindrical sections of the plug of FIG. 2.
Figure 7:
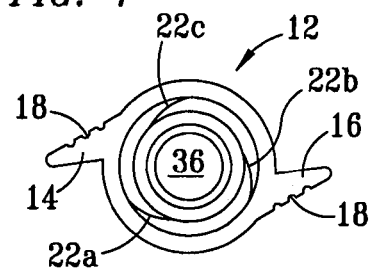
FIG. 7 is a bottom plan view of the handle and cylindrical sections of the plug of FIG. 2.

Referring to FIGS. 3 and 5, threads 22 preferably have a coarse thread pitch and a three-point start thread that helps keep plug 10 coaxially aligned with the open end of a segment of polymeric pipe or tubing 42 (FIG. 5) into which plug 10 is inserted during use. Threads 22 are preferably configured so that cylindrical section 20 of plug 10 can fully engage the flexible inside wall of the pipe or tubing 42 into which cylindrical section 20 is inserted without requiring very many rotations of handle 12. Preferably, cylindrical section 20 will fully engage pipe or tubing 42 with no more than about two turns or rotations of handle 12 relative to the pipe or tubing, and most preferably, no more than about 1½ turns.

Figure 4:
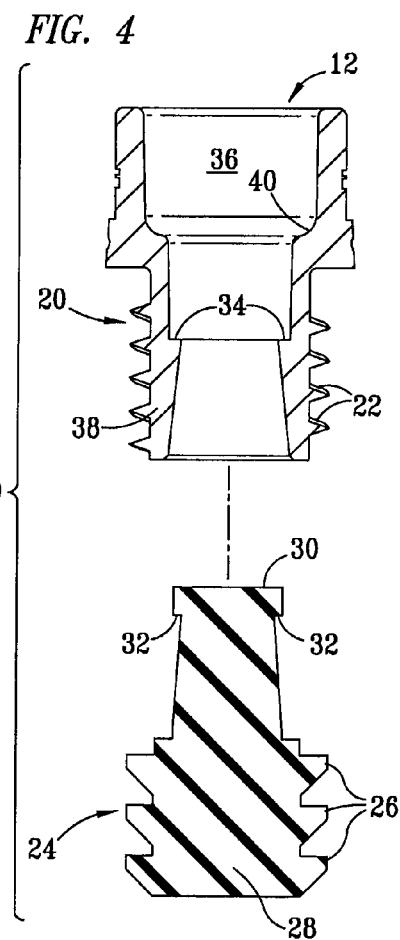
FIG. 4 is an exploded cross-sectional elevation view of the plug of FIG. 3.

Referring to FIGS. 3-5, plug 10 preferably further comprises, as a second element of the invention, elastomeric sealing element 24 having an elongated body 28. Elastomeric body 28 preferably has a configuration that is coaxially alignable with the longitudinal axis through interior 36 of handle 12 and cylindrical section 20, and that is attachable to cylindrical section 20. An attachment structure such as, for example, annular flange 32, is preferably provided near top end 30 of elastomeric sealing member 24, and cooperates with another attachment structure such as annular shoulder 34 inside sidewall 38 of cylindrical section 20 to hold sealing member 24 in place relative to cylindrical section 20. As best seen in FIG. 5, the lower section of the inside of cylindrical section 20 is desirably cooperatively tapered with the outside wall of the upper portion of sealing member 24 to facilitate insertion of the top portion of sealing member 24 into cylindrical section 20 during assembly of plug 10. As top end 30 and annular flange 32 of sealing member 24 are pushed upwardly into cylindrical section 20, flange 32 is compressed inwardly until it passes annular shoulder 34, then snaps outwardly to hold sealing member together with cylindrical section 20 to form plug 10. When supported in this manner, sealing member 24 is forced downwardly into the inside of pipe or tubing 42 as handle 12 is rotated and threads 22 advance cylindrical section 20 into pipe or tubing 42 during installation of plug 10.

Elastomeric sealing member 24 preferably further comprises a plurality of axially spaced annular seals 26 extending radially outward from the lower portion of body 28, each having an outside diameter greater than the inside diameter of polymeric pipe or tubing 42. From about one to about four annular seals 26 are desirably provided, with the use of two or three annular seals being particularly preferred. While additional seals may be provided within the scope of the invention, they are not believed to improve performance of plug 10 in its principal intended use as a hydrostatic test plug, typically in PEX-containing water supply lines having a nominal diameter of ⅜ or ½ inch. Sealing member 24 is preferably unitarily molded. A suitable elastomer for use in making sealing member 24 is Santoprene® rubber, preferably having a durometer of about 65 (Shore A). The configuration of annular seals 26 is preferably such that they can flex in a direction opposite to the direction of travel during insertion into the polymeric pipe or tubing 42, but have sufficient strength and resiliency to establish a fluid-tight seal between sealing element 24 and the inside wall of polymeric pipe or tubing 42 at the hydraulic pressures encountered during use. By way of example, in the preferred embodiment the hydrostatic test pressure can be about 125 psi. The outside diameter and thickness of annular seals 26, and the axial spacing between them, are desirably such that no seal will contact the seal above it when inserted into polymeric pipe or tubing 42.

Other alterations and modifications of the invention will likewise become apparent to those of ordinary skill in the art upon reading this specification in view of the accompanying drawings, and it is intended that the scope of the invention disclosed herein be limited only by the broadest interpretation of the appended claims to which the inventors are legally entitled.

We claim:

1. A polymeric plug for one-time use in hydrostatic pressure testing of polymeric pipe or tubing having an open end and flexible inside and outside walls, the plug comprising:
    a first element further comprising a substantially rigid polymeric handle with a plurality of radially extended wings and a threaded polymeric cylindrical section disposed in fixed relation to the handle, the threaded section being engageable with the open end of the polymeric pipe or tubing; and
    a second element coaxially aligned with and supported by the first element, the second element further comprising an elastomeric sealing member that extends forwardly of the first element and is insertable into the open end of the polymeric pipe or tubing, the elastomeric sealing member comprising a plurality of axially spaced-apart annular polymeric sealing surfaces that provide a fluid seal between the sealing member and the inside wall.

2. The plug of claim 1 wherein the polymeric pipe or tubing comprises crosslinked polyethylene.

3. The plug of claim 1 wherein the threaded cylindrical section is externally threaded and engages the inside wall.

4. The plug of claim 1 wherein the handle is made of glass-filled nylon.

5. The plug of claim 1 wherein the sealing member is made of rubber.

6. The plug of claim 1 wherein the cylindrical section has a coarse thread pitch.

7. The plug of claim 1 wherein the cylindrical section has threads with from two to five starts.

8. The plug of claim 7 wherein the cylindrical section has a three-point start thread.

9. The plug of claim 1 wherein the cylindrical section has threads adapted to fully engage the polymeric pipe or tubing when the handle is rotated no more than about two turns relative to the polymeric pipe or tubing.

10. The plug of claim 9 wherein the cylindrical section has threads adapted to fully engage the polymeric pipe or tubing when the handle is rotated no more than about 1.5 turns relative to the polymeric pipe or tubing.

11. The plug of claim 1 wherein the sealing member comprises up to four axially spaced annular sealing surfaces.

12. The plug of claim 11 wherein the sealing member comprises 2 or 3 sealing surfaces.

13. The plug of claim 1 wherein the sealing member has a durometer of about 65 Shore A.

14. The plug of claim 1 wherein the sealing surfaces are axially spaced-apart a distance sufficient to maintain a space between them when the plug fully engages the polymeric pipe or tubing.

15. The plug of claim 1 wherein the fluid seal is operative at hydrostatic water pressures up to about 125 psi for crosslinked polyethylene tubing having a nominal diameter up to about 0.5 inches.

16. The plug of claim 1 wherein the handle and threaded section are unitarily molded.

17. The plug of claim 1 wherein the first element comprises a first attachment structure, the second element comprises a second attachment structure, and the first and second attachment structures cooperate with each other to hold the first and second elements together prior to use with polymeric pipe or tubing.

18. The plug of claim 1 wherein a portion of the second element is insertable into a portion of the first element and snaps into engagement with the first element.

19. The plug of claim 1 wherein the elastomeric sealing member comprises a longitudinally extending body and a plurality of annular sealing surfaces that extend radially outward from the lower portion of the body.

20. The plug of claim 19 comprising up to about four annular sealing surfaces.

\* \* \* \* \*